(12) United States Patent
Ligtenberg et al.

(10) Patent No.: US 7,532,464 B2
(45) Date of Patent: May 12, 2009

(54) ACCESS SYSTEM FOR A PORTABLE DEVICE

(75) Inventors: Chris Ligtenberg, San Carlos, CA (US); Greg Springer, Sunnyvale, CA (US); Bartley K. Andre, Menlo Park, CA (US); Brett William Degner, Menlo Park, CA (US); Jonathan P. Ive, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 350 days.

(21) Appl. No.: 11/161,043

(22) Filed: Jul. 20, 2005

(65) Prior Publication Data

US 2007/0019375 A1    Jan. 25, 2007

(51) Int. Cl.
*G06F 1/16* (2006.01)
*G11B 33/02* (2006.01)
*A47B 81/00* (2006.01)
*G05B 11/01* (2006.01)

(52) U.S. Cl. .................... 361/685; 361/686; 312/223.2; 720/647; 700/17

(58) Field of Classification Search ................. 361/685, 361/686; 720/647; 312/223.2; 700/17
See application file for complete search history.

(56) References Cited

U.S. PATENT DOCUMENTS

| 4,759,646 | A | 7/1988 | Piatt ............................ 400/88 |
|---|---|---|---|
| 5,513,067 | A | 4/1996 | Ishihara et al. .............. 361/684 |
| 5,905,632 | A * | 5/1999 | Seto et al. .................... 361/683 |
| 6,068,496 | A | 5/2000 | Penate ......................... 439/140 |
| 6,102,721 | A * | 8/2000 | Seto et al. .................... 439/160 |
| 6,178,084 | B1 * | 1/2001 | Shibasaki .................... 361/683 |
| 6,208,506 | B1 * | 3/2001 | Pao ............................. 361/683 |
| 6,261,715 | B1 | 7/2001 | Nakamura .................. 429/100 |
| 6,304,459 | B1 | 10/2001 | Toyosato et al. ............ 361/861 |
| 6,373,693 | B1 * | 4/2002 | Seto et al. .................... 361/685 |
| 6,507,485 | B2 | 1/2003 | Zadesky ...................... 361/683 |
| 6,510,048 | B2 | 1/2003 | Rubenson et al. ........... 361/680 |
| 6,621,691 | B2 * | 9/2003 | Howell ........................ 361/683 |
| 6,697,941 | B2 * | 2/2004 | Kahler et al. ................ 713/100 |
| 6,785,126 | B2 | 8/2004 | Hazzard et al. ............. 361/680 |
| 6,819,961 | B2 | 11/2004 | Jacobs et al. .................. 700/17 |
| 6,888,532 | B2 | 5/2005 | Wong et al. ................. 345/156 |
| 2003/0128475 | A1* | 7/2003 | Wehrenberg ................ 360/250 |
| 2004/0252403 | A1* | 12/2004 | Wehrenberg .................. 360/75 |
| 2005/0128676 | A1 | 6/2005 | Homer et al. ............... 361/300 |
| 2005/0185527 | A1* | 8/2005 | Lin et al. .................. 369/30.27 |

* cited by examiner

*Primary Examiner*—Jayprakash N Gandhi
*Assistant Examiner*—Bradley H Thomas
(74) *Attorney, Agent, or Firm*—Kramer Levin Naftalis & Frankel LLP

(57) ABSTRACT

An access system for a portable device provides a portable computer having a bottom surface. The portable computer is accessed through an active user interface on the bottom surface of the portable computer.

70 Claims, 6 Drawing Sheets

ACCESS SYSTEM FOR A PORTABLE DEVICE

CROSS-REFERENCE TO RELATED APPLICATION

The present application contains subject matter related to a concurrently filed U.S. patent application by Greg Springer, Chris Ligtenberg, Bartley K. Andre, and Brett William Degner entitled "Disk Drive Media Access System". The related application is assigned to Apple Computer, Inc. and is identified by Ser. No. 11/161,040. This application is being filed contemporaneously herewith, and the subject matter thereof is hereby incorporated herein by reference thereto.

TECHNICAL FIELD

The present invention relates generally to portable devices, and more particularly to an access system for a portable device such as a portable computer.

BACKGROUND ART

Computers are becoming increasingly powerful, lightweight, and portable. The computing power of computers that once filled entire rooms is now residing on a desktop. Portable (e.g., "laptop") computers are virtually as powerful as their desktop counterparts. Even smaller hand-held computers are now capable of computing tasks that required much larger computing machines just a few short years ago.

As a result, the use of personal computers is widespread and is rapidly becoming even more prevalent. Due to continuing advances in technology that have enabled the size of personal computers to decrease, the use of portable computers, particularly laptop computers, is increasing at an ever greater and greater pace.

The portability of laptop computers enables a user to keep his or her computer readily accessible such that computing resources are effectively always at hand. By way of example, a wirelessly networked portable computer running on a battery pack enables a user to access computational resources without the need for external electricity sources and free of the need to connect to wired network links. Tasks can thus be performed conveniently, at will, at virtually any location desired.

Contemporary portable computers have a lid display section that pivots or rotates with respect to a base section of the computer. The lid moves between a closed position that places the lid against the base and an open position that exposes the display screen and various components, such as the computer keyboard.

The display section includes a display screen. The base section carries various components used for operating the portable computer. These components may typically include a keyboard, a track pad or other cursor positioning device, a central processing unit ("CPU"), a power supply, memory, a floppy disk drive, a hard disk drive, an optical disk drive ("ODD"), other data storage devices, network connection and interface devices, and so forth.

The network connection and interface devices may be, for example, connectors, ports, or wireless radio devices that enable the portable computer to communicate with external sources and with peripheral devices. Such external sources and peripheral devices may be, for example, a computer network, a printer, a serial device such as a mouse, a scanner, a docking station, and so forth. Connectors or ports may also enable the portable computer to interface with a power source or power supply.

Connectors and ports associated with a portable computer are often located on the sides or the rear of the base section. Occasionally, incidental access is also provided through the bottom of the portable computer, such as, for example, access to its batteries. Often, connectors and ports are covered by manually accessed doors to protect the connectors and ports, e.g., from damage while the portable computer is being transported.

In portable computers, traditional ODD modules are self-contained units having their own enclosures and their own electromagnetic interference ("EMI") shielding. If mounted within the portable computer, the ODD modules are mounted along one side or perimeter edge thereof (typically the left, front, or right side edge). Access for inserting and removing a disk (such as a compact disk ("CD") or a digital versatile disk ("DVD")) is then commonly provided through the adjacent side of the portable computer housing (so-called "sidewall access" or "side-access").

As portable computers have become thinner and thinner, such placement of the ODD is becoming increasingly problematic. For example, the available area on the perimeter edge surfaces of the base of the computer housing (available "real estate") diminishes as the thickness of the portable computer diminishes. Such real estate consequently becomes increasingly valuable as other services compete for use of the same diminishing resources.

Another problematical factor with such ODD configurations can be the geometry of the ODD, which typically includes an extended "wing" along one side or edge thereof. The wing is a thin protuberance for accommodating the full size of a disk. The wing is necessary because the disk drive motor and optical disk reading element (collectively the optical pick-up unit ("OPU")), which are located beneath the disk, are smaller in lateral extent than a disk itself. Therefore, the lower portion of the ODD, in which the OPU is housed, usually has a smaller lateral dimension than the upper portion in which the disk is accommodated. This results in an extended wing on the upper portion of the ODD.

The space or volume beneath the wing and adjacent the lower portion of the ODD housing (i.e., adjacent the narrower lateral extent, or dimension, of the OPU) commonly represents a wasted space or volume within the portable computer. Oftentimes that volume is inconveniently located within the portable computer such that only a portion thereof (and sometimes none) can be utilized for other purposes. Since the overall lateral dimensions of current portable computers are often defined by the computer display, any unused or under-utilized volume within the portable computer housing typically translates undesirably into increased thickness for the computer housing.

Another important consideration is the user interface, and the convenience afforded to the user of the portable computer when inserting and removing a disk from the ODD. Users have become accustomed to convenient access to the ODD through the real estate along the side edges of the portable computer housing. Any reconfiguration, therefore, of the user interface for the ODD must take into account user expectations, efficiency, and convenience. It must not be unintuitive or counter-intuitive.

Thus, a need still remains for better and more efficient systems for configuring and arranging disk drives in conjunction with other internal components in portable computers. In view of the ever increasing commercial competitive pressures, increasing consumer expectations, and diminishing opportunities for meaningful product differentiation in the marketplace, it is increasingly critical that answers be found to these problems. Moreover, the ever-increasing need to save costs and improve efficiencies adds even greater urgency to the necessity that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides an access system for a portable device. A portable computer that has a bottom surface is provided. The portable computer is accessed through an active user interface on the bottom surface of the portable computer.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
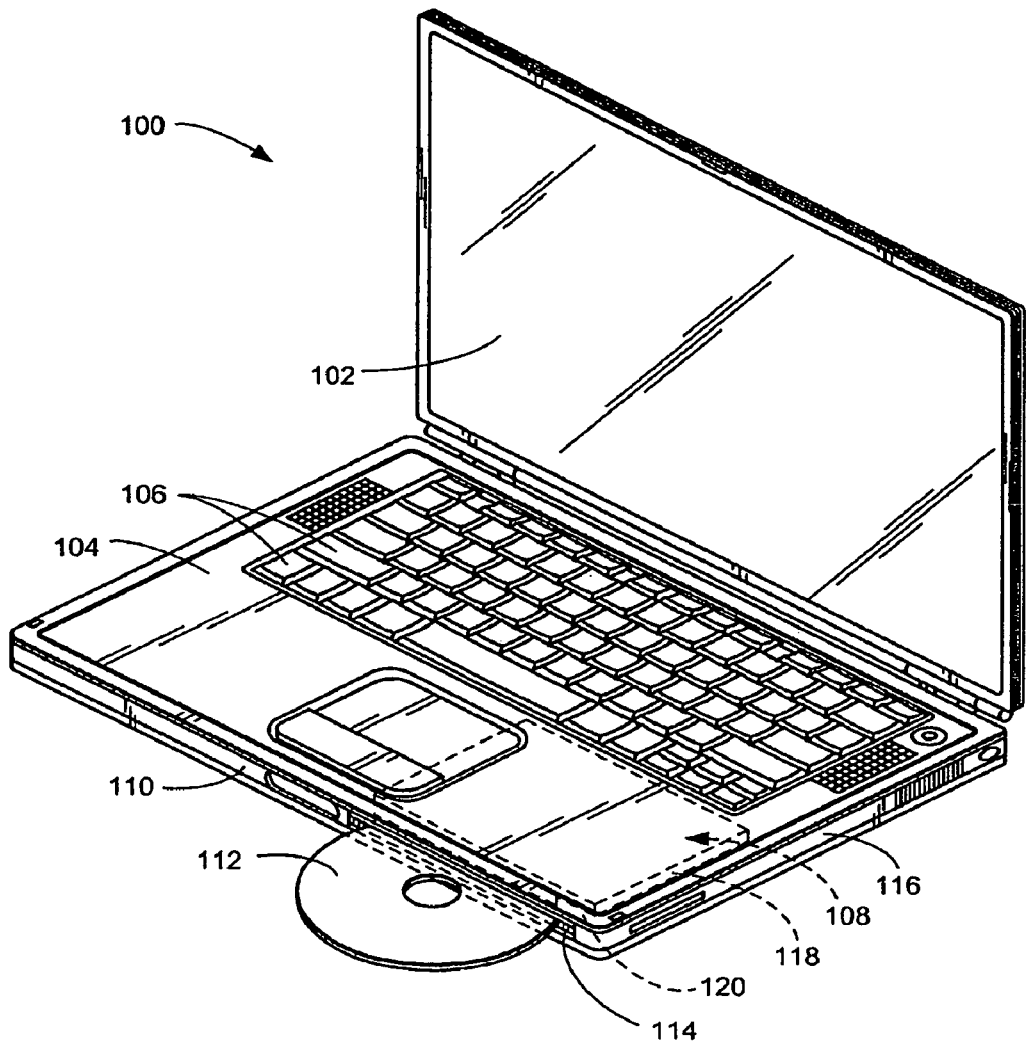
FIG. 1 (PRIOR ART) is a view of a portable computer with a display mounted on a hinge to a housing base.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and operational steps are not disclosed in detail.

Likewise, the drawings showing embodiments of the devices are semi-diagrammatic and not to scale and, particularly, some of the dimensions are for the clarity of presentation and are shown exaggerated in the drawing FIGs. Also, where multiple embodiments are disclosed and described having some features in common, for clarity and ease of illustration, description, and comprehension thereof, similar and like features one to another will ordinarily be described with like reference numerals.

As used herein, the term "personal computer" refers to general-purpose microcomputers that are typically designed to be operated by one person at a time. The term "portable computer" is used herein to refer very broadly to personal computers that are designed and configured to be used in a mobile context, as distinguished from, for example, a "desktop computer" which typically is not considered to be mobile but is instead designed to be used typically in a single location. As used herein, therefore, the term "portable computer" includes, but is not limited to, "laptop computers" (a portable personal computer of a size suitable to rest comfortably on one's legs), "luggable computers" (portable, but not comfortably), "personal digital assistants" ("PDAs") and "palmtops" (easily carried in one hand or a shirt pocket), "notebook computers" (intermediate between laptop computers and palmtops), and so forth.

As used herein, the term "portable device" denotes a personal electronic device having mobility attributes analogous to those of a portable computer, and includes, but is not limited to, cell phones, portable personal music players, and so forth.

The term "bottom" as used herein is defined as that surface of a portable computer, portable device, or analogous portable system that is opposite the surface thereof that has or is generally surrounded by the device's user controls.

The term "horizontal" as used herein is defined as a plane parallel to the bottom of the portable computer, portable device, or portable system. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane, unless understood otherwise within and as a result of a particular context.

In portable computers, traditional, self-contained optical disk drive ("ODD") modules are mounted along one side edge of the portable computer, with access for inserting and removing a disk through the side of the portable computer housing. However, as portable computers become thinner, ODD side edge placement is increasingly challenging. One reason is the diminishing and increasingly valuable perimeter edge surface real estate of the computer housing.

ODD geometry also creates problems in thinner computer housings due to the extended wing along one side of the ODD. The wing is a thin protuberance for accommodating the full size of a disk, which is wider than the disk drive motor and optical disk reading element (collectively the optical pick-up unit ("OPU")).

Within the portable computer, the space or volume beneath the wing and adjacent the OPU is commonly wasted, particularly when that volume is located where only a portion of it can be utilized for other purposes. Any such unused or underutilized volume within the portable computer housing then results in increased computer housing thickness.

ODD geometry also affects the user interface. Users have become accustomed to convenient ODD access through the real estate along the side edges of the portable computer housing. Any reconfiguration of the ODD user interface must therefore not be unintuitive or counter-intuitive.

Accordingly, the present invention teaches and discloses significantly better and unexpectedly more efficient systems for configuring and arranging disk drives in portable computers without wasting space, thus providing for portable computers that can be even thinner in configuration. The present invention simultaneously presents improved, more usable, intuitive, and more convenient interfaces for the user.

Referring now to FIG. 1 (PRIOR ART), therein is shown a portable computer 100 having a display 102 mounted on a hinge to a housing base 104. A keyboard 106 is located on the top surface of the housing base 104. An optical disk drive ("ODD") 108 is mounted within the housing base 104 adjacent the front edge 110 thereof. Access for a disk 112 to the ODD 108 is through a slot 114 in the front edge 110 of the portable computer 100. The front edge 110, the right edge 116, the left edge (not shown) of the housing base 104, and the rear edge (not shown) of the housing base 104 constitute perimeter edge surfaces thereof. Based upon this disclosure, it will also be understood and will be clear to one of ordinary skill in the art that the term "perimeter edge surfaces" is thus not restricted to one or more surfaces having a particular height, and may also refer to and include a perimeter line or edge of zero height, such as would obtain if the portable device had a shape, for example, akin to a "flying saucer".

The ODD 108 has a wing 118 extending outwardly therefrom along one side thereof, and defining a space 120 thereebeneath. In the portable computer 100, the wing 118 extends just beneath the upper surface of the housing base 104 toward the right edge 116 of the housing base 104. The wing 118 accommodates the full width of the disk 112 above the drive mechanism for the ODD 108, the drive mechanism being located beneath the disk 112. This has the unfortunate consequence of locating the space 120 in a fairly inaccessible location along the right edge 116 of the housing base 104, which can lead to under-utilization (and thus waste) of the space 120.

Figure 2:
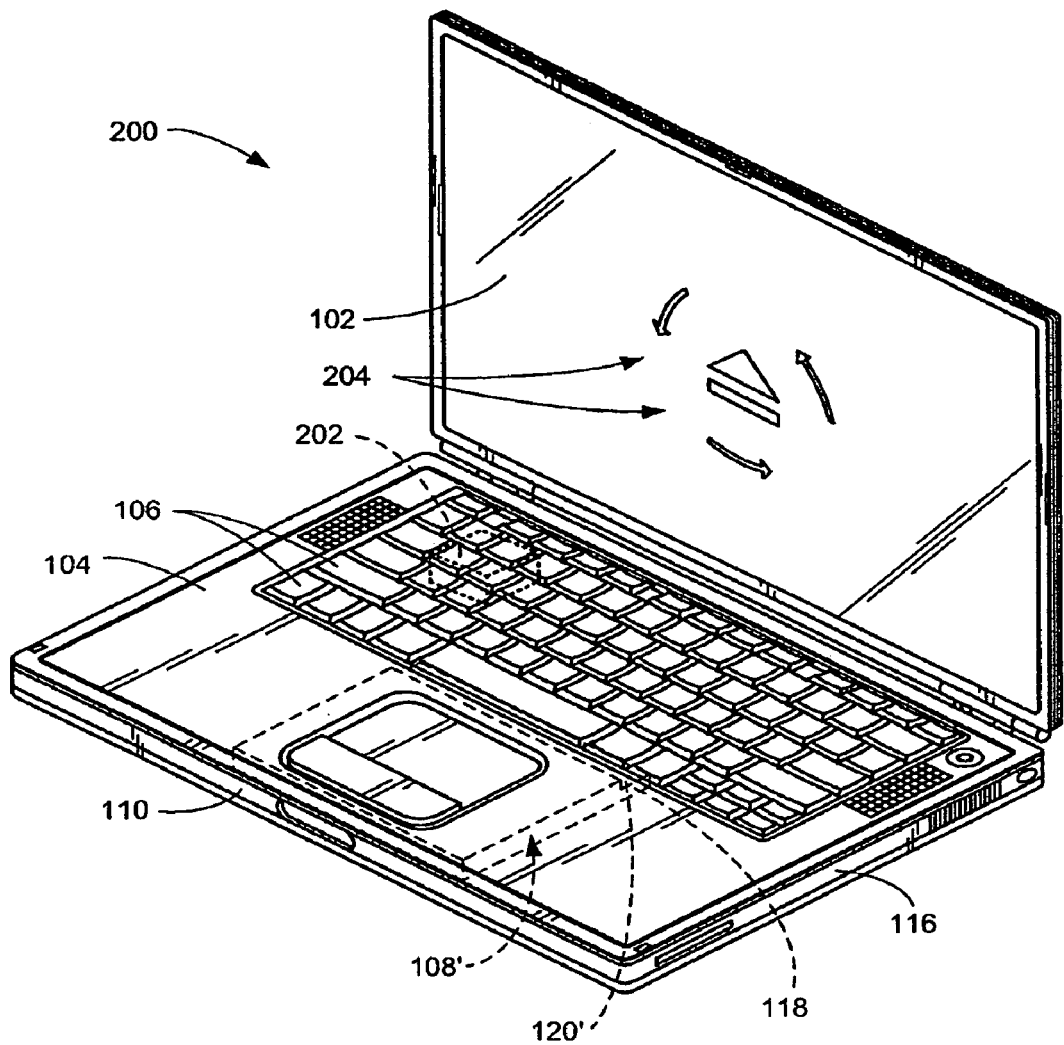
FIG. 2 is a view of a portable computer according to an embodiment of the present invention.

Referring now to FIG. 2, therein is shown a portable computer 200 according to an embodiment of the present invention. In the portable computer 200 the ODD 108' has been inverted, rotated, and moved inwardly and more centrally into the housing base 104, away from the right edge 116 and the other perimeter edge surfaces. Particularly noteworthy is that the wing 118' has been slipped underneath and thus interfitted with the keyboard 106, such that the keyboard 106 occupies and substantially fills the space 120' that is defined by the wing 118'. Thus, the space 120' is substantially fully utilized, resulting in greater space utilization efficiency, and thereby allowing the housing base 104 of the portable computer 200 to be thinner.

The portable computer 200 also contains a mobile motion module ("MMM") 202 that is a triaxial gravitational force ("g-force") detector. In use, the MMM 202 provides important protection for the portable computer 200 by detecting dangerous force-related events such as dropping of the computer. Upon detecting such an event, for example, the MMM 202 can then instruct the hard drive (not shown) and the ODD 108' of the portable computer 200 to park the drive heads to protect against damage upon subsequent impact. The MMM 202 also contains circuitry that continuously reports information concerning the physical orientation of the portable computer 200.

As will be described further hereinbelow, it has been unexpectedly discovered that particularly convenient access to the ODD 108' can be provided by an active user interface 300 (FIG. 3) through the bottom surface 302 (FIG. 3) of the housing base 104, rather than through an edge-actuated interface such as presented by the portable computer 100 (FIG. 1 (PRIOR ART)). Heretofore, the bottom of a portable computer has not been utilized for such active user interface access. Instead, only passive interface utilization has been made, such as the provision of ventilation openings, of access doors for batteries, of connectors for external cables, and so forth. But the user has not actively interacted in this manner with the computer through interfaces on the bottom of such portable computers. Rather, such active user interfaces have been just on the top surface and on the side or perimeter edge surfaces of the portable computer. As thus used, therefore, the term active user interface means that the user directly contacts and manipulates the computer during computer use and operation.

Thus, as disclosed and taught herein, it has been discovered that the portable computer can be inverted during active use thereof to actually utilize the bottom of the portable computer as a bottom-located active user interface.

In the embodiment shown in FIGS. 2-5, for example, the active user interface 300 is the access that is provided for the inwardly-mounted ODD 108'. To utilize this bottom-located active user interface 300, the user preferably just inverts the portable computer 200. To invite (or remind) the user to invert the portable computer 200 prior to accessing the ODD 108' through the active user interface 300, an invert icon 204 may be displayed, for example, on the display 102 in response to a disk access routine. Such a disk access routine might be initiated, for example, by the portable computer 200 upon completion of a disk operation, or by a user request such as pressing a disk access key or key combination on the keyboard 106.

Figure 3:
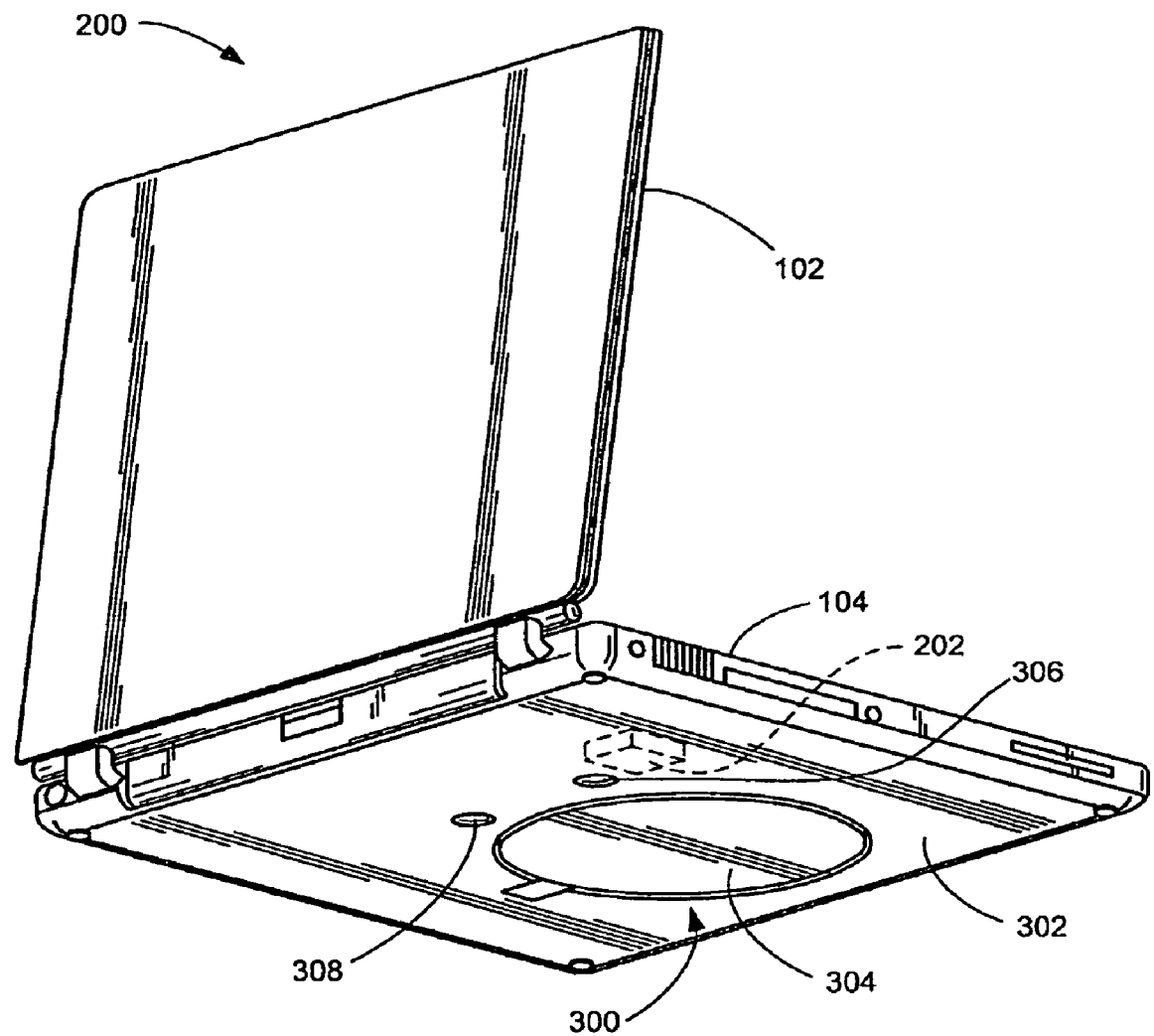
FIG. 3 is a bottom view of the structure of FIG. 2.

Referring now to FIG. 3, therein is shown a bottom view of the portable computer 200 of FIG. 2. In this embodiment, the active user interface 300 that is located on the bottom surface 302 of the housing base 104 is a door 304 for the ODD 108' (not shown, but see FIG. 4). The door 304 is shown in its closed position, thus covering the ODD 108'.

Figure 4:
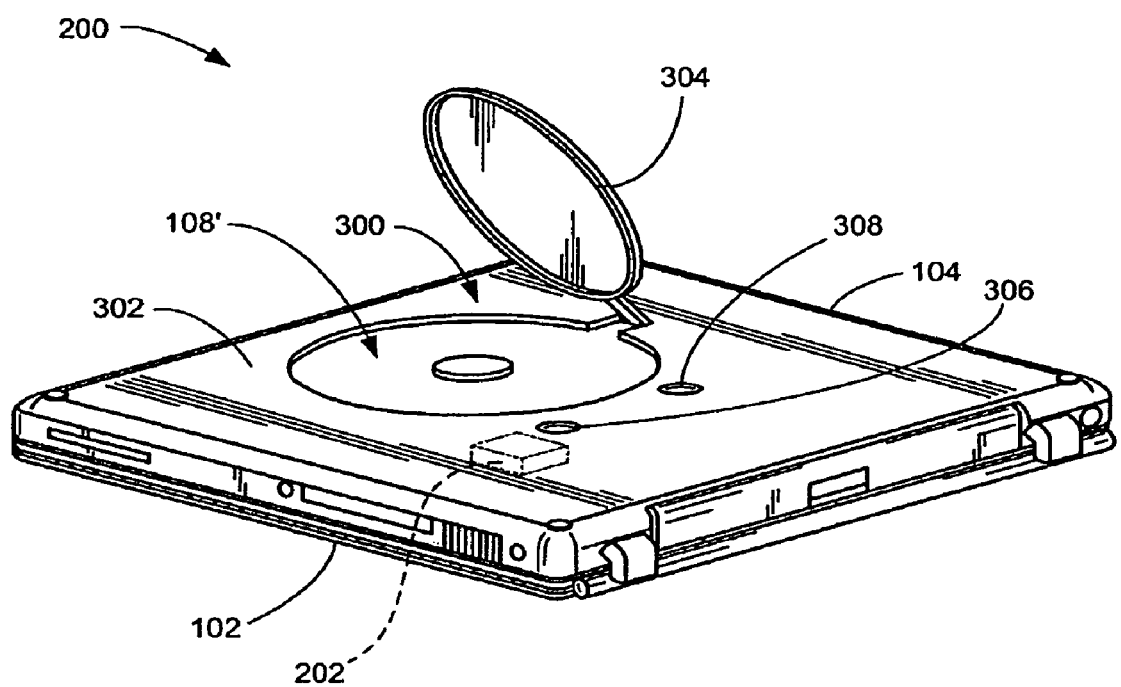
FIG. 4 is a view of the structure of FIGS. 2 and 3, inverted and with the display closed.

Adjacent the door 304 is an actuation button 306 and an indicator light 308. The actuation button 306 may be, for example, a capacitative sensor for user contact to initiate opening of the door 304. The indicator light 308 may illuminate (e.g., blink) to provide a warning that the door 304 is about to open. Thus, the actuation button 306 and the indicator light 308 provide additional forms of active user interfaces on the bottom surface 302 of the portable computer 200 that can be utilized, for example, when the portable computer 200 is oriented upside down (as shown in FIG. 4). Based upon this disclosure it will also now be clear to one of ordinary skill in the art that the actuation button 306 and the indicator light 308 may be utilized to perform other active user interface functions, and that additional such bottom surface active user interface buttons and indicators may be provided, jointly and/or severally, for other desired active user functions as well.

In order to keep the surface of the bottom surface 302 of the portable computer 200 smooth, the actuation button 306 and the indicator light 308 may each be mounted flush on the bottom surface 302.

Referring now to FIG. 4, therein is shown the portable computer 200 of FIGS. 2 and 3, in which the display 102 has been closed and the portable computer 200 inverted. The door 304 has also been actuated to its open position to provide access therethrough to the ODD 108' therebeneath. A disk, such as the disk 112 (FIG. 1 (PRIOR ART)), may now be inserted or removed from the ODD 108'.

It has been unexpectedly discovered that the inversion of the ODD 108', which affords the unexpected space-saving advantages disclosed above, also surprisingly facilitates an advantageously intuitive active user interface function through the bottom surface 302 of the portable computer 200. That is, the inversion of the portable computer 200, to provide access to the active user interface 300 (in this case, the door 304) on the bottom surface 302 of the portable computer 200, results in a "double inversion" of the ODD 108'. As a consequence, when thus accessed by the user, the ODD 108' presents itself to the user in an apparently upright (and in fact, an actual, physically upright) position. In response, the user then correctly and naturally inserts a disk, such as the disk 112 (FIG. 1 (PRIOR ART)) in the correct position. The user interface with the ODD 108' is thus user-friendly and intuitive, and requires no special accommodation. Such would not be the case if the inverted ODD 108' were accessed through traditional side edge access interfaces, because the user would then be required to remember to insert the disk upside-down.

The present invention thus provides a natural, intuitive active user interface 300 through the otherwise passive bottom of the portable computer 200 without requiring the user to make special utilization adjustments, such as inserting a disk in a non-intuitive upside-down orientation. Unexpectedly, therefore, the present invention not only more efficiently utilizes the space defined by the ODD wing 118' (FIGS. 2 and 5), but the present invention also enables a user-friendly active user interface 300 through the bottom surface 302 of the portable computer 200 that looks and feels "correct" to the user and is intuitively consistent with the user's expectations.

Figure 5:
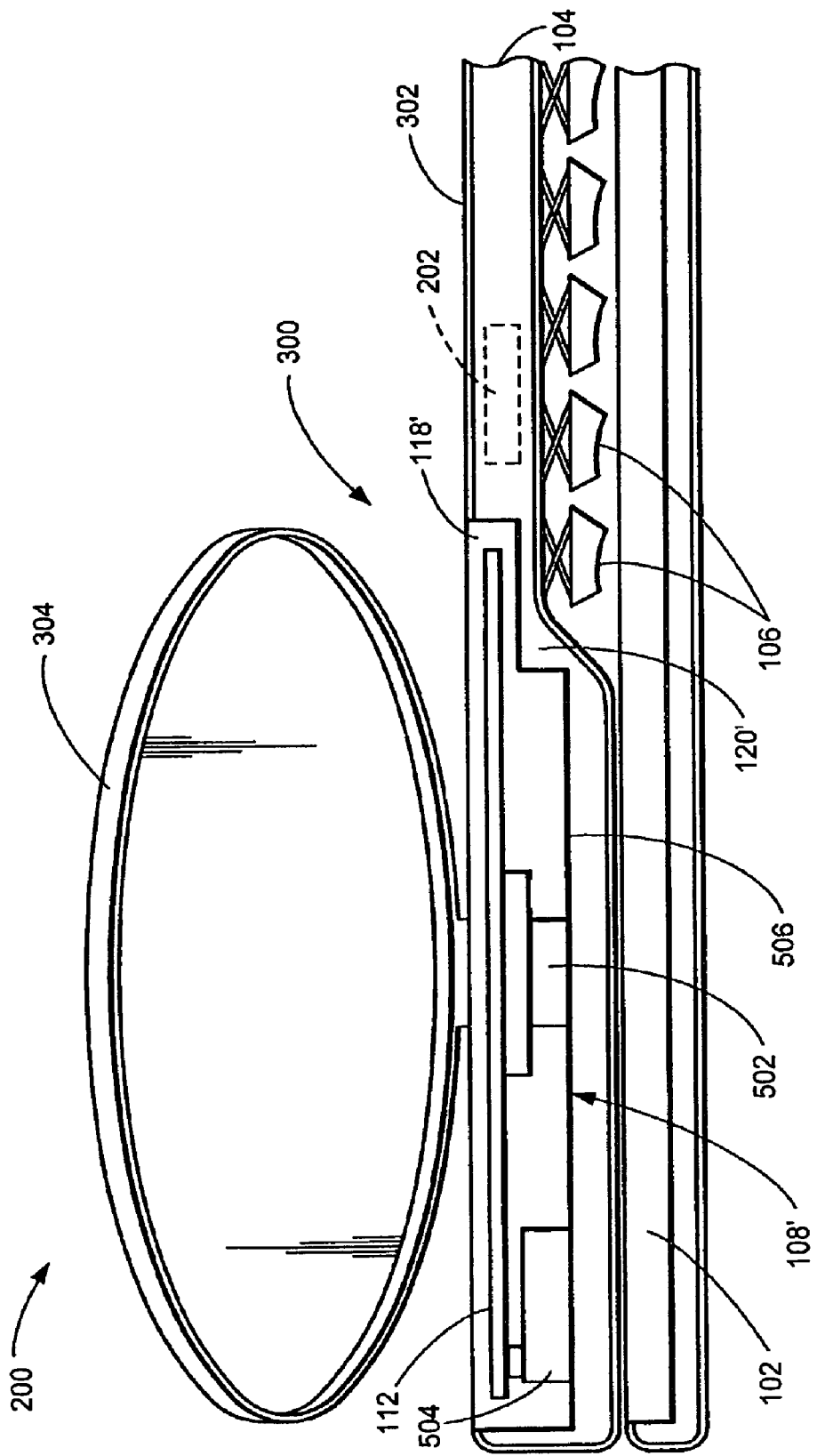
FIG. 5 is a figurative cross-sectional view of a portion of the structure of FIG. 4.

Referring now to FIG. 5, therein is shown a figurative cross-sectional view of a portion of the portable computer 200 shown in FIG. 4. The motor 502 and the laser sensor 504 of the ODD 108' are shown beneath a disk 112 which has been inserted into the ODD 108' beneath the open door 304. The nesting of the wing 118' beneath the keyboard 106 and into the space 120' can also be seen, illustrating the space-saving inter-fitting therebetween.

As also shown in FIG. 5, the ODD 108' is located substantially adjacent the bottom surface 302 of the portable computer 200, and the enclosure 506 of the ODD 108' has been reduced to a minimalist frame, further reducing the thickness and the weight thereof. The enclosure 506 can be thus reduced because the housing base 104 of the portable computer 200 provides the necessary structural integrity and EMI shielding for the ODD 108'. In one embodiment, therefore, the ODD 108' does not have its own EMI shielding and its own rigid structural enclosure.

In operation, the MMM 202 is connected to the controls for the door 304 to prevent the door 304 from being opened when the portable computer 200 is in its ordinary, upright operating orientation. Only when the circuitry in the MMM 202 detects a gravitational force of minus 1 g will the door 304 be allowed to open.

There are several ways in which the user may then open the door 304 to access the ODD 108'. One such method, for example, is to actuate a key or key combination on the keyboard 106, such as a disk eject command, instructing the portable computer 200 to open the door 304. Such a scenario is illustrated in FIG. 2, where the invert icon 204 then indicates that the computer is entering an eject mode, and the arrows within the invert icon 204 symbolize an instruction to the user to invert the portable computer 200 (as well as to close the display 102), to permit the door 304 to open for access to the ODD 108'. Otherwise, in one embodiment, if the portable computer 200 is not inverted within a reasonable, preset time, the circuitry of the MMM 202 will cause the eject command to be aborted.

As shown in FIGS. 3 and 4, another means for accessing the ODD 108' is to first invert the portable computer 200 (as shown in FIG. 4) and then touch the actuation button 306. The actuation button 306 may be, for example, a capacitive sensor that is flush with the surface of the bottom surface 302 of the portable computer 200. The circuitry in the MMM 202 will disable the actuation button 306 when the portable computer 200 is not inverted to prevent inadvertent release and opening of the door 304. Optionally, the indicator light 308 may illuminate and/or blink to provide confirmation that the open command has been received and is being processed. The indicator light 308 may also be used in conjunction with the keyboard actuation mode (optionally including, for example, the display of the invert icon 204). For instance, the indicator light 308 may be used as a count-down timer before the door 304 actually opens.

The MMM 202 and its circuitry thus enable opening of the door 304 and insertion or ejection of a disk from the ODD 108' upon determining that the orientation of the portable computer 200 exceeds a predetermined threshold from a horizontal orientation (for example, that it is upside down or nearly upside down). In one embodiment, the MMM 202 and its circuitry continuously detect the orientation of the portable computer 200 to smoothly enable and perform such access control for the door 304.

Figure 6:
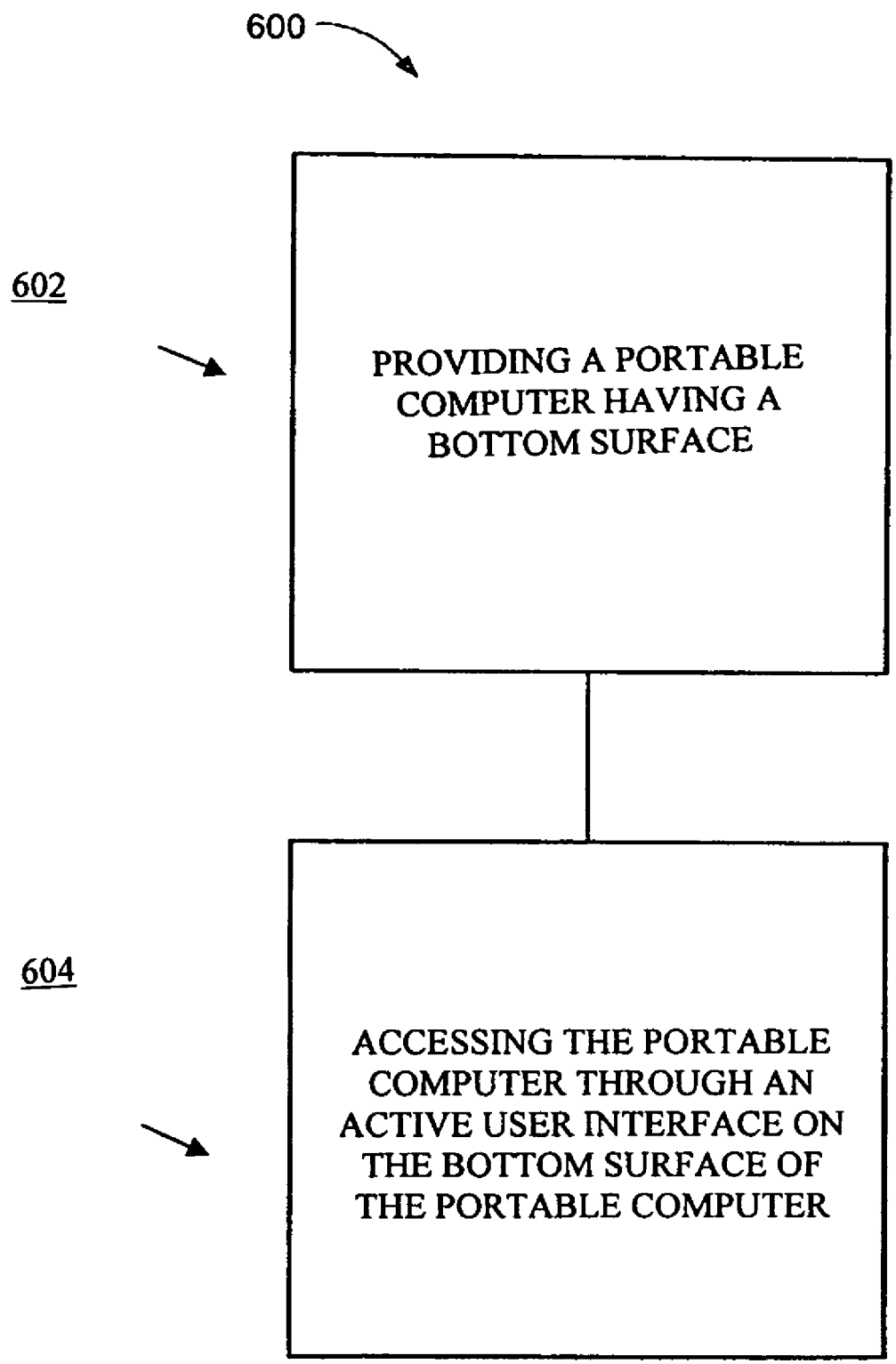
FIG. 6 is a flow chart of an access system for a portable device in accordance with an embodiment of the present invention.

Referring now to FIG. 6, therein is shown a flow chart of an access system 600 for a portable device in accordance with an embodiment of the present invention. The drive access system 600 includes providing a portable computer having a bottom surface in a block 602; and accessing the portable computer through an active user interface on the bottom surface of the portable computer in a block 604.

It has been discovered that the present invention thus has numerous advantages.

A principle advantage is that the present invention provides more efficient space utilization for ODDs within the body of a portable device.

Another significant advantage is that the present invention enables and provides an active user interface through the heretofore passively utilized bottom of a portable device.

Yet another advantage is that it has been unexpectedly discovered that such an active user interface can be provided in an intuitively agreeable and useful manner for the user.

Still another important advantage is that the bottom surface active user interface enables real-time interactive user actions and controls that direct the operation of the portable device while it is in an actively functioning mode.

Another advantage of the present invention is that it advantageously utilizes existing orientation detection mechanisms and information to supervise access through the bottom surface active user interface to assure, for example, that the ODD door remains closed when the portable device is in its conventional, upright configuration.

Yet another important advantage of the present invention is that it valuably supports and services the historical trend of reducing costs, simplifying systems, and increasing performance.

These and other valuable aspects of the present invention consequently further the state of the technology to at least the next level.

Thus, it has been discovered that the drive access system of the present invention for a portable device furnishes important and heretofore unknown and unavailable solutions, capabilities, and functional advantages for improving and reducing the thickness and space utilization efficiency of portable device configurations. The resulting configurations and utilization methodologies are unobvious yet straightforward, cost-effective, uncomplicated, highly versatile and effective, can be implemented by adapting known technologies, and are thus readily suited for efficiently and economically manufacturing ever smaller, thinner, lighter, and more cost effective end economical portable devices such as portable computers.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters hithertofore set forth herein

What is claimed is:

1. An access system for a portable device, comprising:
providing a portable computer having a bottom surface;
accessing the portable computer through an active user interface on the bottom surface of the portable computer;
detecting the orientation of the portable computer; and
enabling access to the active user interface on the bottom surface of the portable computer when the orientation of the portable computer exceeds a predetermined threshold from a horizontal orientation.

2. The system of claim 1 wherein accessing the portable computer through an active user interface on the bottom surface of the portable computer further comprises accessing the portable computer while the portable computer is inverted.

3. The system of claim 1 wherein accessing the portable computer through an active user interface on the bottom surface of the portable computer further comprises disabling access through the active user interface on the bottom surface of the portable computer when the portable computer is not inverted.

4. The system of claim 1 wherein accessing the portable computer through an active user interface on the bottom surface of the portable computer further comprises utilizing at least one of an actuation button and an indicator light located on the bottom surface of the portable computer.

5. The system of claim 1 wherein accessing the portable computer through an active user interface on the bottom surface of the portable computer further comprises:
utilizing at least one of an actuation button and an indicator light located on the bottom surface of the portable computer; and
disabling access through the active user interface on the bottom surface of the portable computer when the portable computer is not inverted.

6. The system of claim 1 wherein accessing the portable computer through an active user interface on the bottom surface of the portable computer further comprises accessing the active user interface on the bottom surface of the portable computer utilizing at least one of a keyboard actuation button and display of an invert icon.

7. An access system for a portable device, comprising:
providing a portable computer having a bottom surface; and
accessing the portable computer through an active user interface on the bottom surface of the portable computer, wherein accessing the portable computer through an active user interface on the bottom surface of the portable computer further comprises:
accessing the active user interface on the bottom surface of the portable computer utilizing at least one of a keyboard actuation button and display of an invert icon; and
aborting an access command if the portable computer is not inverted within a predetermined time.

8. An access system for a portable device, comprising:
providing a portable device having a bottom surface connected to perimeter edge surfaces;
mounting a disk drive within the portable device;
accessing the disk drive through an active user interface on the bottom surface of the portable device;
detecting the orientation of the portable device; and
enabling ejection of a disk from the disk drive when the orientation of the portable device exceeds a predetermined threshold from a horizontal orientation.

9. The system of claim 8 wherein providing a portable device further comprises providing a portable computer.

10. The system of claim 8 wherein mounting a disk drive further comprises mounting an optical disk drive.

11. The system of claim 8 wherein mounting a disk drive further comprises mounting the disk drive inverted in the portable device.

12. The system of claim 8 wherein mounting a disk drive further comprises mounting the disk drive inverted in the portable device and interfitted with a keyboard in the portable device.

13. The system of claim 8 wherein mounting a disk drive further comprises mounting the disk drive within the portable device inwardly from the perimeter edge surfaces of the portable device.

14. The system of claim 8 wherein mounting a disk drive further comprises mounting a disk drive that does not have a rigid structural enclosure.

15. The system of claim 8 wherein mounting a disk drive further comprises mounting a disk drive that does not have electromagnetic interference shielding.

16. The system of claim 8 wherein accessing the disk drive through the bottom surface of the portable device further comprises accessing the disk drive through the bottom surface of the portable device while the portable device is inverted.

17. The system of claim 8 wherein accessing the disk drive through the bottom surface of the portable device further comprises accessing the disk drive through a door located on the bottom surface of the portable device.

18. The system of claim 8 wherein accessing the disk drive through the bottom surface of the portable device further comprises:
accessing the disk drive through a door located on the bottom surface of the portable device; and
disabling opening of the door when the portable device is not inverted.

19. The system of claim 8 wherein accessing the disk drive through the bottom surface of the portable device further comprises accessing the disk drive utilizing at least one of an actuation button and an indicator light located on the bottom surface of the portable device.

20. The system of claim 8 wherein accessing the disk drive through the bottom surface of the portable device further comprises:
accessing the disk drive utilizing at least one of an actuation button and an indicator light located on the bottom surface of the portable device; and
disabling the actuation button when the portable device is not inverted.

21. The system of claim 8 wherein accessing the disk drive through the bottom surface of the portable device further comprises accessing the disk drive utilizing at least one of a keyboard actuation button and display of an invert icon.

22. An access system for a portable device, comprising:
providing a portable device having a bottom surface connected to perimeter edge surfaces;
mounting a disk drive within the portable device; and
accessing the disk drive through an active user interface on the bottom surface of the portable device, wherein accessing the disk drive through the bottom surface of the portable device further comprises:
accessing the disk drive utilizing at least one of a keyboard actuation button and display of an invert icon; and
aborting an eject command if the portable device is not inverted within a predetermined time.

23. An access system for a portable device, comprising:
  providing a portable computer having a base and a display, the base having top and bottom surfaces connected by perimeter edge surfaces;
  mounting an optical disk drive for the portable computer within the base of the portable computer between the top and bottom surfaces and the perimeter edge surfaces of the portable computer, and substantially adjacent the bottom surface thereof;
  accessing the optical disk drive through an active user interface on the bottom surface of the portable computer;
  detecting the orientation of the portable computer; and
  enabling ejection of a disk from the disk drive when the orientation of the portable computer exceeds a predetermined threshold from a horizontal orientation.

24. The system of claim 23 wherein mounting an optical disk drive further comprises mounting the optical disk drive inverted in the base of the portable computer.

25. The system of claim 23 wherein mounting an optical disk drive further comprises mounting the optical disk drive inverted in the base of the portable computer and interfitted with a keyboard in the base of the portable computer.

26. The system of claim 23 wherein mounting an optical disk drive further comprises mounting the optical disk drive within the portable computer inwardly from the perimeter edge surfaces of the portable computer.

27. The system of claim 23 wherein mounting an optical disk drive further comprises mounting an optical disk drive that does not have a rigid structural enclosure.

28. The system of claim 23 wherein mounting an optical disk drive further comprises mounting an optical disk drive that does not have electromagnetic interference shielding.

29. The system of claim 23 wherein accessing the optical disk drive through an active user interface on the bottom surface of the portable computer further comprises accessing the disk drive through the bottom surface of the portable computer while the portable computer is inverted.

30. The system of claim 23 wherein accessing the optical disk drive through an active user interface on the bottom surface of the portable computer further comprises accessing the disk drive through a door located on the bottom surface of the portable computer.

31. The system of claim 23 wherein accessing the optical disk drive through an active user interface on the bottom surface of the portable computer further comprises:
  accessing the disk drive through a door located on the bottom surface of the portable computer; and
  disabling opening of the door when the portable computer is not inverted.

32. The system of claim 23 wherein accessing the optical disk drive through an active user interface on the bottom surface of the portable computer further comprises accessing the disk drive utilizing at least one of an actuation button and an indicator light located and mounted flush on the bottom surface of the portable computer.

33. The system of claim 23 wherein accessing the optical disk drive through an active user interface on the bottom surface of the portable computer further comprises:
  accessing the disk drive utilizing at least one of an actuation button and an indicator light located and mounted flush on the bottom surface of the portable computer; and
  disabling the actuation button when the portable computer is not inverted.

34. The system of claim 23 wherein accessing the optical disk drive through an active user interface on the bottom surface of the portable computer further comprises accessing the disk drive utilizing at least one of a keyboard actuation button and display of an invert icon.

35. An access system for a portable device, comprising:
  providing a portable computer having a base and a display, the base having top and bottom surfaces connected by perimeter edge surfaces;
  mounting an optical disk drive for the portable computer within the base of the portable computer between the top and bottom surfaces and the perimeter edge surfaces of the portable computer, and substantially adjacent the bottom surface thereof; and
  accessing the optical disk drive through an active user interface on the bottom surface of the portable computer, wherein accessing the optical disk drive through an active user interface on the bottom surface of the portable computer further comprises:
    accessing the disk drive utilizing at least one of a keyboard actuation button and display of an invert icon; and
    aborting an eject command if the portable computer is not inverted within a predetermined time.

36. An access system for a portable device, comprising:
  a portable computer having a bottom surface;
  an active user interface on the bottom surface of the portable computer; and
  circuitry for disabling access through the active user interface on the bottom surface of the portable computer when the portable computer is not inverted.

37. The system of claim 36 wherein the active user interface on the bottom surface of the portable computer further comprises an active user interface that is configured for accessing while the portable computer is inverted.

38. The system of claim 36 wherein the active user interface on the bottom surface of the portable computer further comprises at least one of an actuation button and an indicator light located on the bottom surface of the portable computer.

39. The system of claim 36 wherein the active user interface on the bottom surface of the portable computer further comprises at least one of a keyboard actuation button and an invert icon.

40. An access system for a portable device, comprising:
  a portable computer having a bottom surface; and
  an active user interface on the bottom surface of the portable computer, wherein the active user interface on the bottom surface of the portable computer further comprises:
    at least one of an actuation button and an indicator light located on the bottom surface of the portable computer; and
    circuitry for disabling access through the active user interface on the bottom surface of the portable computer when the portable computer is not inverted.

41. An access system for a portable device, comprising:
  a portable computer having a bottom surface; and
  an active user interface on the bottom surface of the portable computer, wherein the active user interface on the bottom surface of the portable computer further comprises:
    at least one of a keyboard actuation button and an invert icon; and
    circuitry for aborting an access command if the portable computer is not inverted within a predetermined time.

42. An access system for a portable device, comprising:
  a portable computer having a bottom surface;
  an active user interface on the bottom surface of the portable computer;

circuitry for detecting the orientation of the portable computer; and circuitry for enabling access to the active user interface on the bottom surface of the portable computer when the orientation of the portable computer exceeds a predetermined threshold from a horizontal orientation.

43. An access system for a portable device, comprising:
a portable device having a bottom surface and perimeter edge surfaces connected to the bottom surface;
a disk drive mounted within the portable device; and
active access for the disk drive through the bottom surface of the portable device, wherein the access for the disk drive through the bottom surface of the portable device further comp rises:
a door located on the bottom surface of the portable device; and
circuitry for disabling opening of the door when the portable device is not inverted.

44. The system of claim 43 wherein the portable device further comprises a portable computer.

45. The system of claim 43 wherein the disk drive further comprises an optical disk drive.

46. The system of claim 43 wherein the disk drive is mounted inverted in the portable device.

47. The system of claim 43: further comprising a keyboard in the portable device; and wherein the disk drive is mounted inverted in the portable device and interfitted with the keyboard.

48. The system of claim 43 wherein the disk drive is mounted within the portable device inwardly from the perimeter edge surfaces of the portable device.

49. The system of claim 43 wherein the disk drive further comprises a disk drive that does not have a rigid structural enclosure.

50. The system of claim 43 wherein the disk drive further comprises a disk drive that does not have electromagnetic interference shielding.

51. The system of claim 43 wherein the access for the disk drive through the bottom surface of the portable device further comprises access that is configured for accessing the disk drive through the bottom surface of the portable device while the portable device is inverted.

52. The system of claim 43 wherein the access for the disk drive through the bottom surface of the portable device further comprises at least one of an actuation button and an indicator light located on the bottom surface of the portable device.

53. The system of claim 43 wherein the access for the disk drive through the bottom surface of the portable device further comprises at least one of a keyboard actuation button and an invert icon.

54. An access system for a portable device, comprising:
a portable device having a bottom surface and perimeter edge surfaces connected to the bottom surface;
a disk drive mounted within the portable device; and
active access for the disk drive through the bottom surface of the portable device, wherein the access for the disk drive through the bottom surface of the portable device further comprises:
at least one of an actuation button and an indicator light located on the bottom surface of the portable device; and
circuitry for disabling the actuation button when the portable device is not inverted.

55. The system of claim 54 wherein the access for the disk drive through the bottom surface of the portable device further comprises a door located on the bottom surface of the portable device.

56. An access system for a portable device, comprising:
a portable device having a bottom surface and perimeter edge surfaces connected to the bottom surface;
a disk drive mounted within the portable device; and
active access for the disk drive through the bottom surface of the portable device, wherein the access for the disk drive through the bottom surface of the portable device further comprises:
at least one of a keyboard actuation button and an invert icon; and
circuitry for aborting an eject command if the portable device is not inverted within a predetermined time.

57. An access system for a portable device, comprising:
a portable device having a bottom surface and perimeter edge surfaces connected to the bottom surface;
a disk drive mounted within the portable device;
active access for the disk drive through the bottom surface of the portable device;
circuitry for detecting the orientation of the portable device; and
circuitry for enabling ejection of a disk from the disk drive when the orientation of the portable device exceeds a predetermined threshold from a horizontal orientation.

58. An access system for a portable device, comprising:
a portable computer having a base, a display, and perimeter edge surfaces, the base having top and bottom surfaces, and the perimeter edge surfaces connecting the top and bottom surfaces of the base;
an optical disk drive for the portable computer mounted within the base of the portable computer between the top and bottom surfaces and the perimeter edge surfaces, and substantially adjacent the bottom surface of the base of the portable computer;
an active user interface on the bottom surface of the portable computer, the active user interface providing access for the optical disk drive;
circuitry for detecting the orientation of the portable computer; and
circuitry for enabling ejection of a disk from the disk drive when the orientation of the portable computer exceeds a predetermined threshold from a horizontal orientation.

59. The system of claim 58 wherein the optical disk drive is mounted inverted in the base of the portable computer.

60. The system of claim 58 further comprising a keyboard in the base of the portable computer; and wherein the optical disk drive is mounted inverted in the base of the portable computer and interfitted with the keyboard.

61. The system of claim 58 wherein the optical disk drive is mounted within the portable computer inwardly from the perimeter edge surfaces of the portable computer.

62. The system of claim 58 wherein the optical disk drive further comprises an optical disk drive that does not have a rigid structural enclosure.

63. The system of claim 58 wherein the optical disk drive further comprises an optical disk drive that does not have electromagnetic interference shielding.

64. The system of claim 58 wherein the active user interface on the bottom surface of the portable computer further comprises an active user interface that is configured for accessing the disk drive through the bottom surface of the portable computer while the portable computer is inverted.

65. The system of claim 58 wherein the active user interface on the bottom surface of the portable computer further comprises a door located on the bottom surface of the portable computer.

66. The system of claim 58 wherein the active user interface on the bottom surface of the portable computer further comprises at least one of an actuation button and an indicator light located and mounted flush on the bottom surface of the portable computer.

67. The system of claim 58 wherein the active user interface on the bottom surface of the portable computer further comprises at least one of a keyboard actuation button and an invert icon.

68. An access system for a portable device, comprising:
a portable computer having a base, a display, and perimeter edge surfaces, the base having top and bottom surfaces, and the perimeter edge surfaces connecting the top and bottom surfaces of the base;
an optical disk drive for the portable computer mounted within the base of the portable computer between the top and bottom surfaces and the perimeter edge surfaces, and substantially adjacent the bottom surface of the base of the portable computer; and
an active user interface on the bottom surface of the portable computer, the active user interface providing access for the optical disk drive, wherein the active user interface on the bottom surface of the portable computer further comprises: a door located on the bottom surface of the portable computer; and circuitry for disabling opening of the door when the portable computer is not inverted.

69. An access system for a portable device, comprising:
a portable computer having a base, a display, and perimeter edge surfaces, the base having top and bottom surfaces, and the perimeter edge surfaces connecting the top and bottom surfaces of the baser
an optical disk drive for the portable computer mounted within the base of the portable computer between the top and bottom surfaces and the perimeter edge surfaces, and substantially adjacent the bottom surface of the base of the portable computer; and
an active user interface on the bottom surface of the portable computer, the active user interface providing access for the optical disk drive, wherein the active user interface on the bottom surface of the portable computer further comprises:
at least one of an actuation button and an indicator light located and mounted flush on the bottom surface of the portable computer; and
circuitry for disabling the actuation button when the portable computer is not inverted.

70. An access system for a portable device, comprising:
a portable computer having a base, a display, and perimeter edge surfaces, the base having top and bottom surfaces, and the perimeter edge surfaces connecting the top and bottom surfaces of the base;
an optical disk drive for the portable computer mounted within the base of the portable computer between the top and bottom surfaces and the perimeter edge surfaces, and substantially adjacent the bottom surface of the base of the portable computer; and
an active user interface on the bottom surface of the portable computer, the active user interface providing access for the optical disk drive, wherein the active user interface on the bottom surface of the portable computer further comprises:
at least one of a keyboard actuation button and an invert icon; and
circuitry for aborting an eject command if the portable computer is not inverted within a predetermined time.

* * * * *